Feb. 23, 1960 J. YERVANT 2,925,813
BARBECUE STAND
Filed Aug. 28, 1957 2 Sheets-Sheet 1

INVENTOR.
JOHN YERVANT
BY
Frank Makara
ATTORNEY

Feb. 23, 1960  J. YERVANT  2,925,813
BARBECUE STAND
Filed Aug. 28, 1957  2 Sheets-Sheet 2
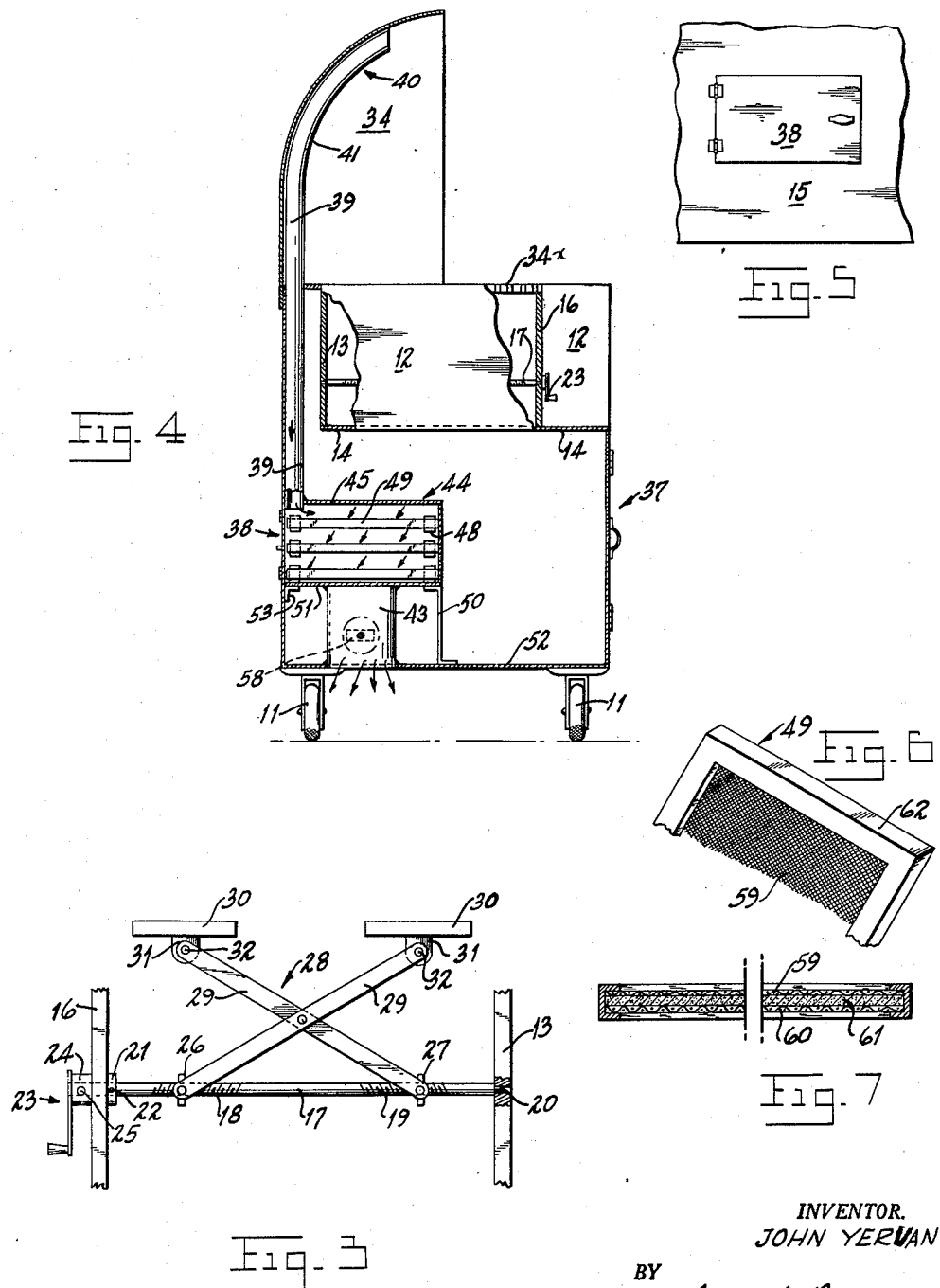
INVENTOR.
JOHN YERVANT
BY
Frank Makora
ATTORNEY

United States Patent Office 2,925,813
Patented Feb. 23, 1960

2,925,813

BARBECUE STAND

John Yervant, Searington, N.Y.

Application August 28, 1957, Serial No. 680,840

1 Claim. (Cl. 126—25)

This invention relates to a barbecue stand and more particularly to a mobile stand for indoor use, having means therein for filtering out smoke particles.

It is an object of this invention to provide a mobile or moveable barbecue stand for indoor restaurant or home use.

It is another object to provide a moveable barbecue stand with means for transporting the smoke and fumes from the charcoal broiling section to a filtering unit.

It is another object to provide a moveable barbecue stand for indoor use with means for filtering out the smoke and other obnoxious particles coming from the broiling section and to conduct smoke-free air from the stand back into the indoor space.

It is a further object to provide a novel barbecue stand for indoor use which does not foul the indoor air and which is of inexpensive construction.

Figure 1:
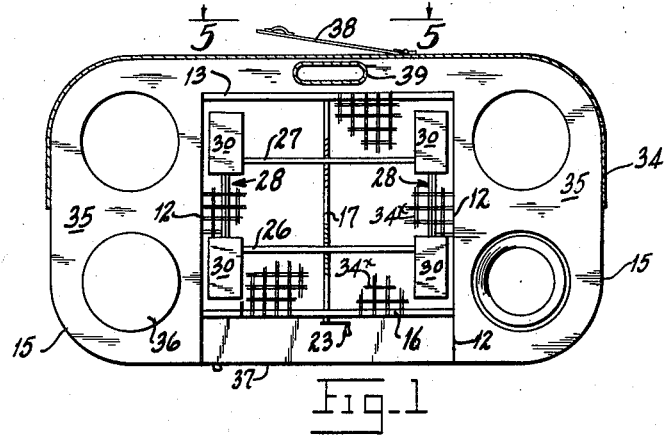
Figure 2:
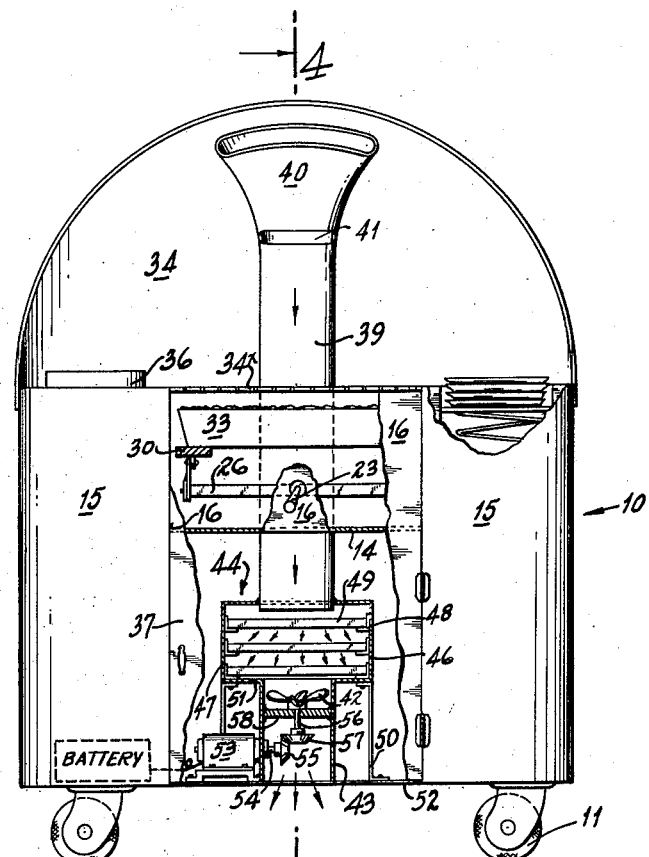

These and other objects of this invention are readily understood by reading the following descriptive disclosure of an illustrative embodiment of the invention shown in the accompanying drawing in which:

Fig. 1 is a top view with the hood partly in section, of the rectangular form of this invention, Fig. 2 is a front view of the invention broken away in part to show the interior construction of the stand, Fig. 3 is a detail view showing the extensible means used to raise and lower the broiling coals, Fig. 4 is a vertical section view taken on line 4—4 of Fig. 2 of the barbecue stand showing the flue means for conveying broiling smoke into a filtering chamber and the means for cleaning the smoke particles out of the air, Fig. 5 is a view of the rear filter chamber door for replacing the filter plates, Fig. 6 is a perspective view of a filter plate showing the manner of securing a rectangular holding screen within a rectangular frame and Fig. 7 is a cross-section view of a filter screen pad showing the manner of securing the smoke removing particles, for example, activated charcoal between a top and bottom holding screens.

This invention preferably is made of corrosion resistant metal or plastic, which may be provided with decorative effects. Thus the outside panels may be of aluminum sheeting, stainless steel or plastic. Preferably the hood is made of transparent plastic, such as Lucite (methyl methacrylate) or of transparent glass.

Preferably also, though not shown, the hood is provided with a complementary moveable hood section secured suitably and hingedly to the stationary hood section shown in Fig. 1.

The shape of the stand may be substantially rectangular, as shown in Fig. 1, or it may be round or oval.

The motor used to induce a suction draft may be battery operated or it may optionally be operated by plugging into a suitable house circuit. Where the stand is battery operated, the battery is of suitable capacity to operate the suction motor for a long period of time.

The stand may be provided with an interior electric light, if desired, secured to the flue within the hood adjacent the flue mouth.

The barbecue stand is also preferably provided with pans for holding hot water. These pans are disposed below the sauce-holding and vegetable holding pots as well as about or below the spring loaded plate holder thereby keeping the food and plates hot until secured.

Obviously this inventive stand may be modified noninventively to a great degree but all these obvious modifications do not detract from the inventive concept of providing a moveable barbecue stand with self-contained means for purifying the air used in the charcoal broiling process.

Turning now to the illustrative embodiment of this invention a wheeled carriage is provided with a substantially rectangular body 10 supported upon a plurality of roller wheels 11, preferably rubber tired wheels.

The top of the carriage body 10 is preferably provided with an open top recessed chamber or channel formed by opposed vertical channel side walls 12, channel back wall 13 and bottom wall 14 and a transverse channel front wall 16.

The exterior wall 15 of the carriage body 10 is made preferably of corrosion resistant aluminum and is curved around a conventional carriage frame (not shown).

The recessed chamber is provided with barbecue means including a vertical front support wall 16. A double threaded rotary adjusting rod 17 having a right handed threaded section 18 and a left handed threaded section 19 is provided with rear end stud 20 disposed in a suitable aperture in rear chamber wall 13 (Fig. 4).

The front end of rod 17 is passed through a suitable aperture in wall 16 and held in place by a lock washer 21 secured by a set screw 22 to rod 17.

A conventional handle crank 23 having an integral flange 24 is secured by set screw 25 to the portion of the rod 17 protruding beyond front wall 16.

A pair of opposed rectangular rods 26 and 27 having suitable screw threaded apertures are threaded respectively on the threaded sections 18 and 19 of the rotary adjusting rod 17.

A pair of conventional crossed and centrally pivoted tong arms 29 is provided with a plate 30 having a depending fixedly secured stem 31.

Each stem 31 is secured by a pivot pin 32 to its respective arm 29 with sufficient and suitable frictional force so as to maintain the face plate 30 in a horizontal position at all times.

A suitably proportioned rectangular pan 33 is disposed upon the four plates 30 and charcoal for broiling is provided in said pan 33. A grill 34X of conventional manufacture is placed upon the top edge of vertical walls 13 and 16.

Clearly rotation of crank arm 23 causes the scissor arms 28 to raise or lower pan 33 with its incandescent charcoal depending upon whether the rotation of crank is clockwise or counter-clockwise.

The barbecue stand of this invention is provided with a curved rear hood 34, fixed at its base by conventional means, such as spot welding, metal screws, welding, etc., to the back of body wall 15 adjacent the wall top edge.

The rear hood 34 preferably is provided with a complementary front hood (not shown) hingedly secured to the opposed side walls of hood 34 thereby providing, when the front hood is in closed position, a fully enclosed barbecue platform 35. As stated previously rear hood 34 and the front hood hinged thereto may be made of glass, so that the barbecuing process may be done under glass in full view of the guests.

The barbecue top platform 35 is provided with for example four holes, in three of which are disposed conventional sauce and vegetable pans 36, and in the fourth hole a conventional spring-loaded plate server is disposed. These serving pans 36 as well as the plates of the server may be maintained in a hot condition by means of hot water or steaming pans (not shown).

The front wall of body wall 15 is provided with a front door 37 of conventional manufacture and the rear wall of body wall 15 is provided with a rear double hinged door 38 adapted to engage body wall 15 in a substantially hermetically sealed relationship. This may be accomplished by suitably lining the inner contacting edge of door 38 with resilient rubber, or it may be accomplished by effecting suitable flat metal to metal contact.

The interior wall of hood 34 is provided with a flue pipe 39 having a flared mouth 40.

The flue pipe 39 is preferably provided with a slot opening 41 disposed in suitably spaced relationship to the top of grill 34 to effect efficient removal of cooking smoke. The mouth aperture of the flared mouth is of a suitable size to effect removal of those smoke and odor particles that escape removal through slot aperture 41.

The smoke and odor particles are sucked into flue 39 by a suction fan 42 disposed in a conduit 43 secured hermetically to a filter chamber 44, said flue 39 being hermetically disposed in a suitable aperture in the top wall 45 of chamber 44.

Filter chamber 44 preferably is of rectangular configuration with door 38 forming the rear wall of the chamber 44. The interior surface of the vertical side walls 46 and 47 are provided with a plurality of suitably spaced L-shaped support brackets 48 preferably spot welded to the respective chamber walls. As shown in Figs. 2 and 4 a group of four brackets 48 are disposed in the opposed chamber walls 46 and 47 in planar relationship so that the bracket arms form a four-pointed support for each filter unit 49.

Preferably a plurality of parallel disposed filter units 49 are employed so that the smoke from flue pipe 39 may be trapped in one of the successive filter units if it were not trapped in a preceding filter unit.

The filter units are replaced, as needed, as when filled or clogged with extracted smoke and odor particles, by opening door 38, whereupon new filter units are placed in the chamber in lieu of the old removed units.

The chamber structure 44 is supported by means of support rods 50 disposed between and secured to the bottom wall 51 of chamber 44 and the bottom wall 52 of the carriage body.

An additional longitudinal support bar 53 may be provided for chamber 44 and secured to the interior of the rear wall of body wall 15 immediately below chamber wall 51 and adjacent to the bottom edge of door 38. The bar 53 may be welded to wall 15 or secured thereto by other conventional means. Clearly the circular conduit 43 also functions to support chamber 44.

A suitable aperture is provided in bottom wall 52 and the conduit 43 secured thereabout as by welding. An electrical motor 53 (battery operated where a battery is used in lieu of house current) is provided with a shaft 54 protruding through conduit 43 and a bevel gear 55 is disposed on the end of shaft 54.

A mating bevel gear 57 is secured to a fan shaft 56. Shaft 56 is supported in a cross-arm bar 58 and supports fan 42. Obviously the motor and fan may both be disposed in conduit 43 if so desired.

The direction of the suction draft is shown by means of arrows in the flue 39, filter chamber 44 and conduit 43.

The filter units 49 of this invention are shown in detail in Figs. 6 and 7. Preferably the filter 49 is provided with a top facing screen 59 of wire or plastic and an opposed bottom screen 60 of like material. Screens 59 and 60 are disposed in spaced-apart relationship and smoke and odor removing granular media such as activated carbon 61, silica gel, fuller's earth, alumina, etc., is poured between said opposed screens.

Screens 59 and 60 are rectangular and are held fixedly together by means of a border channel U-shaped element 62 engaging said rectangular screens about their entire periphery.

In lieu of screens 59 and 60 a mat of glass wool or glass fibers may be used. And in some cases the entire rectangular filter unit may be suitably thick glass fiber or glass wool disposed within the border element 62.

This invention is of broad scope and is not to be limited to the embodiment shown for illustration purposes. The main features of this invention being a self-contained smoke and odor removal device disposed within and coacting with a mobile barbecue grill.

I claim:

As an article of manufacture, a mobile charcoal barbecue device for indoor use for complete removal of obnoxious smoke and odors consisting essentially of a wheeled substantially rectangular housing having a top wall, having a suitably recessed traverse center channel, having a separate channel back wall, a transverse vertical wall disposed in said channel in suitably spaced relationship to the channel back wall; and said housing having a rectangularly apertured back wall, and having a rectangular filter chamber disposed beneath said channel, said chamber having an apertured top and an apertured bottom wall and a door hingedly disposed over the rectangular aperture of said back wall; a curved hood secured to the entire top edge of said back wall and disposed in part over said channel, a flue conduit secured to the inner surface of said hood and back wall and having its top opening adjacent the top edge of said hood and having its bottom opening hermetically secured in the opening of said top wall of said filter chamber; grill means completely disposed in said channel in the plane of said top wall, charcoal elevating means disposed within said channel below said grill means and secured to and between said channel back wall and channel transverse wall selectively moving charcoal on the elevating means, to and away from said grill means, filter means removably disposed in said filter chamber through said chamber door, and exhaust fan means hermetically secured in the aperture of said bottom wall of said chamber whereby charcoal broiling fumes and odors are sucked into said filter means and removed therein.

References Cited in the file of this patent

UNITED STATES PATENTS

| Number | Name | Date |
|---|---|---|
| 360,372 | Calone et al. | Mar. 29, 1887 |
| 411,185 | Crosby et al. | Sept. 17, 1889 |
| 928,921 | Adams | July 27, 1909 |
| 1,377,694 | Koehler | May 10, 1921 |
| 1,513,357 | Webber | Oct. 28, 1924 |
| 1,752,007 | Kline | Mar. 25, 1930 |
| 1,909,207 | Mikody | May 16, 1933 |
| 1,916,907 | Sargent | July 4, 1933 |
| 2,095,745 | Hiatt | Oct. 12, 1937 |
| 2,112,041 | Miller | Mar. 22, 1938 |
| 2,138,874 | Myers | Dec. 6, 1938 |
| 2,211,940 | Stoner | Aug. 20, 1940 |
| 2,369,375 | Sonntag | Feb. 13, 1945 |
| 2,532,420 | Pledger | Dec. 5, 1950 |
| 2,573,115 | Sisto | Oct. 30, 1951 |
| 2,624,329 | Ernst | Jan. 6, 1953 |
| 2,634,718 | Williams | Apr. 14, 1953 |
| 2,800,864 | Ward | July 30, 1957 |
| 2,812,038 | Krueger | Nov. 5, 1957 |
| 2,819,667 | Victor | Jan. 14, 1958 |
| 2,831,267 | Gardner | Apr. 22, 1958 |
| 2,862,095 | Schofield | Nov. 25, 1958 |